3,766,070
DIURETHANE-DIUREA-THICKENED GREASE COMPOSITIONS

Thomas F. Wulfers, St. Louis, Mo., assignor to Shell Oil Company, New York, N.Y.
No Drawing. Filed Oct. 1, 1970, Ser. No. 77,383
Int. Cl. C10m *5/20, 7/30, 7/34*
U.S. Cl. 252—51.5 A      10 Claims

ABSTRACT OF THE DISCLOSURE

Grease compositions comprising an oleaginous base vehicle having incorporated therein a minor about of a diurethane-diurea thickening agent have excellent high temperature dynamic lubricating properties. The diurethane-diurea thickeners are produced from monohydric alcohols, diisocyanates and diamines.

---

This invention relates to grease compositions and to thickening agents incorporated theerin. More particularly, it relates to grease compositions comprising an oleaginous base vehicle gelled to grease consistency by the use of a class of novel diurethane-diurea thickening agents.

A continuing need exists in the art for the development of grease compositions capable of providing effective lubrication at high temperatures, e.g., temperatures of 300° F. to 400° F. and above. Numerous thickening agents have been proposed for use in such greases including soap base thickeners, inorganic clay thickeners and more recently, organic thickening agents. Examples of this latter category of thickeners include ureas, ureido compounds, aminoaryl diureas, triazines and the like. Such thickening agents are generally prepared by reacting one or more mono-, di-, or poly-amines with one or more mono-, di-, or poly-isocyanates which results in the formation of a compound having a plurality of urea linkages, (i.e.,

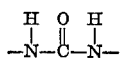

linkages). While thickeners of this type generally produce greases having dropping points significantly higher than metal soap-based greases, the urea-type organic thickening agents have frequently been found to have less than desirable properties in other important aspects, for example, shear stability, oxidation stability, high temperature bearing performance and water resistance.

It has now been found that greases thickened with a minor amount of a diurethane-diurea compound do not exhibit the aforementioned deficiencies or at least to a considerably less degree, and therefore are eminently suitable for high temperature lubricating applications as well after applications at lower temperatures. The diurethane-diurea thickening agents which impart the unique properties to the present compositions are those of the general formula:

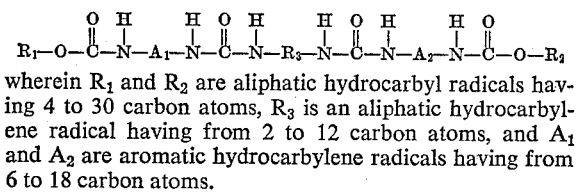

wherein $R_1$ and $R_2$ are aliphatic hydrocarbyl radicals having 4 to 30 carbon atoms, $R_3$ is an aliphatic hydrocarbylene radical having from 2 to 12 carbon atoms, and $A_1$ and $A_2$ are aromatic hydrocarbylene radicals having from 6 to 18 carbon atoms.

The aforesaid thickening agents can be conveniently prepared by reacting separately, or in situ in the base vehicle, one or more diisocyanates with one or more diamines and one or more monohydric alcohols as hereinafter described.

The reaction of the alcohol component with the diisocyanate component produces urethane linkages which are believed to be largely responsible for the unique characteristics of the present thickeners, not exhibited by previously proposed thickening agents.

Monohydric alcohols which can be used in the preparation of the diurethane-diurea thickeners include aliphatic alcohols having from 4 to 30, preferably from 9 to 24, carbon atoms. Examples of such alcohols include nonyl, lauryl, tetradecyl, hexadecyl, octadecyl, octadecenyl, eicosyl and docosyl alcohols, and the like. Thickeners prepared using octadecyl alcohol have been found to be particularly advantageous.

Diamines suitable for preparing the present thickening agents include those having from 2 to 12, preferably from 2 to 6 carbon atoms, such as ethylenediamine, propylenediamine, trimethylenediamine, tetramethylenediamine, hexamethylenediamine, xylenediamine, toluenediamine and the like. Of the foregoing, alkylene diamines are preferred, especially ethylenediamine which has been found to form particularly advantageous thickening agents.

Diisocyanates which can be effectively reacted with the aforedescribed alcohols and diamines are preferably mono- or di-nuclear aromatic diisocyanates having a total of from 6 to 20 carbon atoms. Such diisocyanates include biphenylenediisocyanates, naphthylenediisocyanates and monophenylenediisocyanates including tolylenediisocyanate. Illustrative of such diisocyanates are 3,3-dimethylbiphenyl - 4,4'-diisocyanate, diphenylmethane-4,4'-diisocyanate, 3,3 - dimethyldiphenylmethane-4,4'-diisocyanate, 2,4-tolylenediisocyanate, 1,5-naphthylenediisocyanate and mixtures of 2,4- and 2,6-tolylenediisocyanates. 2,4-tolylenediisocyanate and mixtures of 2,4- and 2,6-tolylenediisocyanates are particularly preferred diisocyanate reactants.

The thickeners employed in the present compositions are advantageously prepared in two steps, either separately and then added to the base vehicle, or in situ employing the base vehicle as solvent. In a preferred method of preparation, the alcohol and diisocyanate components are reacted separately and the resulting reaction product then added to the lubricant vehicle together with the diamine reactant, and the second reaction step conducted in situ utilizing the base vehicle as solvent. This method of preparation is described in further detail in Example I.

The molar proportions of alcohol, diisocyanate and diamine involved in the reaction are 1:1:1/2, respectively.

The aforedescribed diurethane-diurea thickeners are employed in the present compositions in an amount sufficient to gel the oleaginous base vehicle to a grease consistency. This amount can vary, for example, from about 5–50% by weight of the total composition. Normally, however, thickener concentrations of 10–35% by weight are sufficient to impart the desired consistency to the inventive compositions.

A wide variety of lubricating oils may be employed as the base vehicle in the present compositions. Suitable base oils include mineral lubricating oils such as naphthenic base, paraffin base or mixed base oils having a viscosity in the range of from 50 SSU at 100° F. to 300 SSU at 210° F.; synthetic hydrocarbon oils such as oligomerized alpha-olefins and oils derived from coal products; synthetic oils such as alkylene polymers, alkylene oxide-type polymers, polyalkene glycols, silicone polymers, polyethers, phosphate esters, dicarboxylic acid esters and pentaerythritol esters. The above oils may be used individually or in mixtures thereof, wherever miscible or made so by the use of solvents. Of the aforementioned base oils, mineral lubricating oils having viscosities of from about 400 to 700 SSU at 100° F. are especially preferred.

In addition to the diurethane-diurea thickeners, the present compositions can also contain anti-corrosion additives such as disodium sebacate, glyceryl monooleate, sodium sulfonates, sodium nitrite, amino- and benzo-triazoles, and isostearamides or imidazolines of tetraethylenepentamine; oxidation inhibitors such as phenyl-alpha-naphthylamine, phenyl-beta-naphthylamine, diphenylamines, phenothiazine, dithiocarbamates and various alkylated derivatives thereof; viscosity index improvers such as methacrylate polymers and copolymers; extreme pressure agents, and any other additive recognized in the art to perform a particular function or functions.

The following examples illustrate the method of preparation of the present compositions and their excellent properties. It is to be understood, however, that these examples are presented for illustrative purposes only and that the invention in its broader aspects should not be limited thereto.

EXAMPLE I

A mixture of 270 g. of octadecyl alcohol and 522 g. of 2,4-tolylenediisocyanate, in a solvent consisting of a mixture of 1 liter of chloroform and 2 liters of hexane, was stirred at room temperature for 20 hours. The product which crystallizes out of this mixture was collected by filtration and recrystallized from hexane to yield 265 g. of product having a melting point of 74-75° C. 118.3 g. of the recovered product was added to 500 g. of a paraffinic-base mineral oil having a viscosity of 500 SSU at 100° F. which was then heated to 90° C. Ethylenediamine (8.0 g.) was added to the mixture and the temperature was raised to 135° C. The mixture was cooled and milled through a three-roll paint mill. Additional oil was added to bring the grease to proper consistency. The resulting grease contained 14% by weight thickener, had an ASTM unworked penetration of 275, and an ASTM worked penetration (after 60 strokes) of 290.

EXAMPLE II

The procedure of Example I was repeated except that a synthetic hydrocarbon lubricating oil was employed as the base vehicle in place of the paraffinic-base mineral oil. The synthetic hydrocarbon oil which was used had a viscosity of 237 SSU at 100° F. and comprised essentially hydrogenated $C_{16}$ to $C_{70}$ oligomers of a mixture of $C_8$ and $C_{10}$ normal alpha olefins. The resulting grease composition contained 20% by weight thickener, had an ASTM unworked penetration of 260, and an ASTM worked penetration (after 60 strokes) of 276.

EXAMPLE III

In order to demonstrate the outstanding properties of the present compositions, a grease prepared in accordance with Example I containing 1.0% by weight phenyl-alpha-naphthylamine was subjected to a series of tests as shown in Table I. For comparative purposes, a fully formulated, commercially available, tetra-urea thickened grease was also tested in accordance with the same procedures with the results as shown.

TABLE I

| Test procedure | Grease 1 | Commercial grease |
|---|---|---|
| Dropping point, ° F. (ASTM D 566) | 480 | 450 |
| Penetration (ASTM D 217): | | |
| Unworked | 275 | 275 |
| 60 strokes | 290 | 305 |
| 100,000 strokes | 356 | 430 |
| Roll stability test (ASTM D 1831): | | |
| Hours to 230 penetration, 77° F | 120 | <2 |
| Hours to 230 penetration, 212° F | 144 | 370 |
| Water washout test (ASTM D 1264): | | |
| Percent loss at 100° F | 2.5 | 3.4 |
| Percent loss at 175° F | 2.5 | 2.5 |
| Oxidation stability test (ASTM D 942): | | |
| Pressure drop, 100 hours, p.s.i | 0 | 2 |
| Pressure drop, 500 hours, p.s.i | 1 | 8 |
| ABEC bearing test (Fed. test mtd. No. 333), 10,000 r.p.m., 350° F., hours to failure | ¹ 600 | 406 |

¹ Average of eight runs.

The data in the foregoing table demonstrate the excellent shear stability, oxidation resistance and high temperature lubricating characteristics of the present compositions. As noted in the table, the penetration value of Grease 1 of the invention was significantly lower than that of the tetra-urea thickened grease after 100,000 strokes in the ASTM worker. The inventive composition not only exhibited superior resistance to oxidative degradation in comparison with the commercial product, but in addition out-performed the tetra-urea thickened grease in the ABEC Bearing test by a considerable margin. Thus, it is clearly evident that the diurethanediurea structure of the thickeners employed in the present compositions impart certain unique properties to the grease of the invention, not attainable by the use of previously proposed thickening agents.

I claim as my invention:

1. A grease composition consisting essentially of a major amount of an oleaginous base vehicle and in an amount sufficient to thicken the base vehicle to grease consistency, a diurethane-diurea compound having the formula:

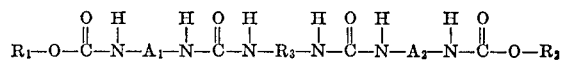

wherein $R_1$ and $R_2$ are aliphatic hydrocarbyl radicals having from 4 to 30 carbon atoms $R_3$ is an aliphatic hydrocarbylene radical having from 2 to 12 carbon atoms, and $A_1$ and $A_2$ are aromatic hydrocarbylene radicals having from 6 to 18 carbon atoms.

2. The composition of claim 1 wherein the diurethane-diurea compound is present in the amount of from 5 to 50% by weight.

3. The composition of claim 2 wherein $R_3$ is an alkylene radical having from 2 to 6 carbon atoms.

4. The composition of claim 3 wherein $R_1$ and $R_2$ are alkyl radicals each having 9 to 24 carbon atoms.

5. The composition of claim 4 wherein the $A_1$ and $A_2$ radicals are derived from biphenylene, monophenylene or naphthylene diisocyanates.

6. The composition of claim 1 wherein the oleaginous base vehicle is a mineral lubricating oil having a viscosity of from 400 to 700 SSU at 100° F., and the diurethane-diurea compound is present in the amount of from 10 to 35% by weight.

7. The composition of claim 6 wherein $R_1$ and $R_2$ are octadecyl groups.

8. The composition of claim 7 wherein $R_3$ is an ethylene group.

9. The composition of claim 8 wherein $A_1$ and $A_2$ are tolylene groups.

10. The composition of claim 6 wherein the oleaginous base vehicle is an oligomerized alpha-olefin lubricating oil.

References Cited

UNITED STATES PATENTS

| | | | |
|---|---|---|---|
| 3,242,210 | 3/1966 | Dreher et al. | 252—51.5 A |
| 3,243,372 | 3/1966 | Dreher et al. | 252—51.5 A |
| 3,374,170 | 3/1968 | Hedenburg et al. | 252—51.5 A |
| 3,423,318 | 1/1969 | Bauer et al. | 252—51.5 A |
| 3,689,413 | 9/1972 | Loeffler | 252—51.5 A |

DANIEL E. WYMAN, Primary Examiner

Y. H. SMITH, Assistant Examiner